United States Patent
Lapidot et al.

(10) Patent No.: US 8,301,319 B2
(45) Date of Patent: *Oct. 30, 2012

(54) PERSONAL NAVIGATION SYSTEM

(75) Inventors: Zvi Lapidot, Rehovot (IL); Abraham Aharoni, Rehovot (IL)

(73) Assignee: Lumus Ltd., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,306

(22) Filed: Feb. 14, 2012

(65) Prior Publication Data

US 2012/0179369 A1 Jul. 12, 2012

Related U.S. Application Data

(63) Continuation of application No. 11/816,520, filed as application No. PCT/IL2006/000195 on Feb. 15, 2006, now Pat. No. 8,140,197.

(30) Foreign Application Priority Data

Feb. 17, 2005 (IL) .......................................... 166983

(51) Int. Cl.
G01C 23/00 (2006.01)
G06T 15/00 (2006.01)
G06F 17/30 (2006.01)

(52) U.S. Cl. ............. 701/9; 701/428; 701/468; 340/951
(58) Field of Classification Search ................ 701/9, 14, 701/16, 17, 301; 345/7, 8, 9; 342/357.08, 342/357.31

See application file for complete search history.

(56) References Cited

U.S. PATENT DOCUMENTS

| | | | |
|---|---|---|---|
| 5,838,262 A | 11/1998 | Kershner et al. | |
| 6,064,335 A * | 5/2000 | Eschenbach | 342/357.31 |
| 6,094,625 A | 7/2000 | Ralston | |
| 6,101,431 A * | 8/2000 | Niwa et al. | 701/14 |
| 6,297,767 B1 | 10/2001 | Scnoh | |
| 6,798,392 B2 | 9/2004 | Hartwell et al. | |
| 6,934,633 B1 | 8/2005 | Gallagher et al. | |
| 7,106,217 B2 | 9/2006 | Judge et al. | |
| 2004/0080467 A1 | 4/2004 | Chinthammit et al. | |
| 2004/0119986 A1 | 6/2004 | Benke et al. | |
| 2005/0140573 A1* | 6/2005 | Riser et al. | 345/7 |

FOREIGN PATENT DOCUMENTS

EP 1 398 601 A2 3/2004

* cited by examiner

Primary Examiner — Tan Q Nguyen

(57) ABSTRACT

There is provided a personal navigation system, including a head-mounted orientation sensor, a coordinate position sensor, a head-mounted display, and a processor receiving an input from the head-mounted orientation sensor and an input from the coordinate position sensor and providing a visually sensible output for displaying on the head-mounted display.

23 Claims, 10 Drawing Sheets

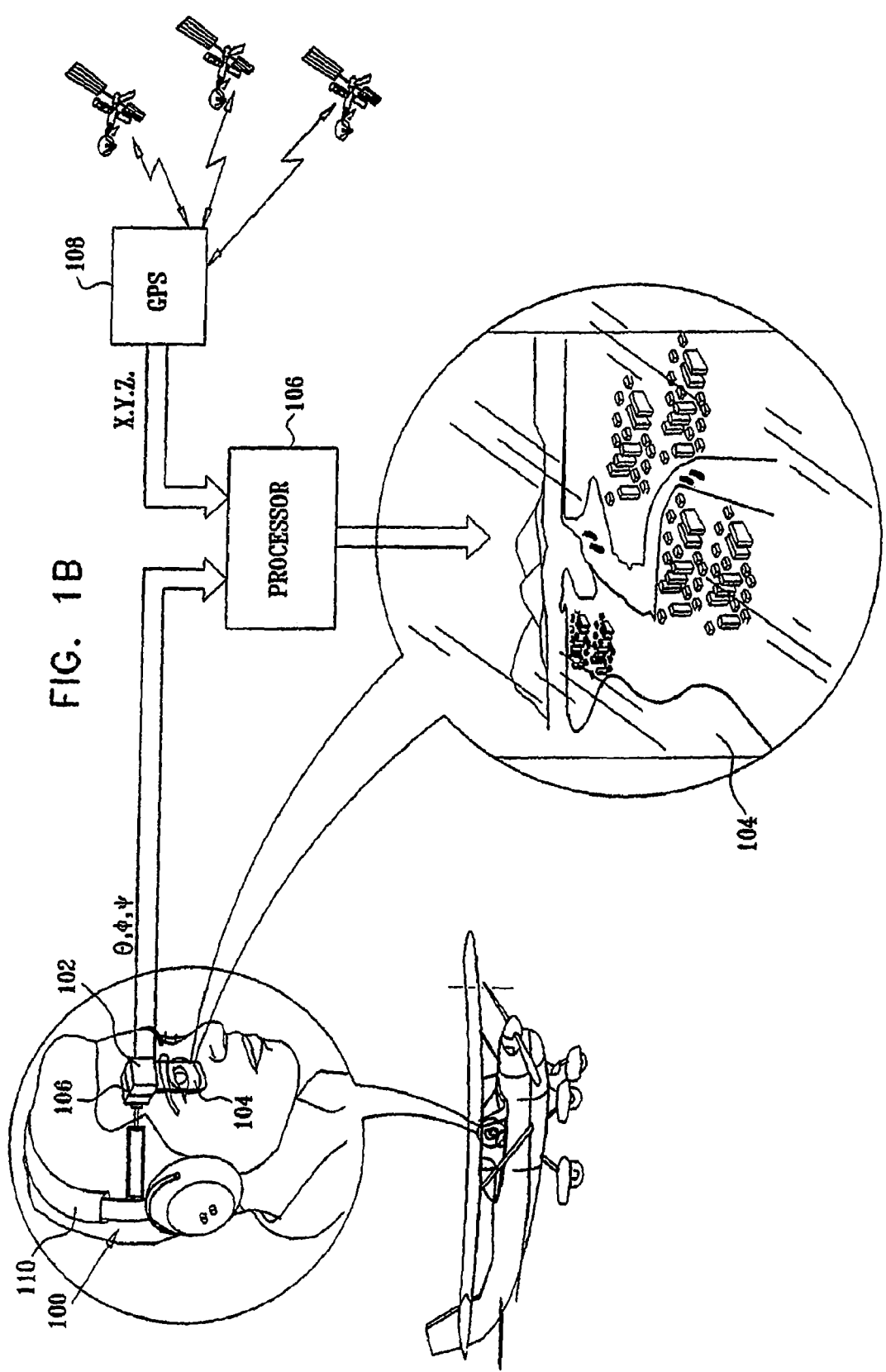

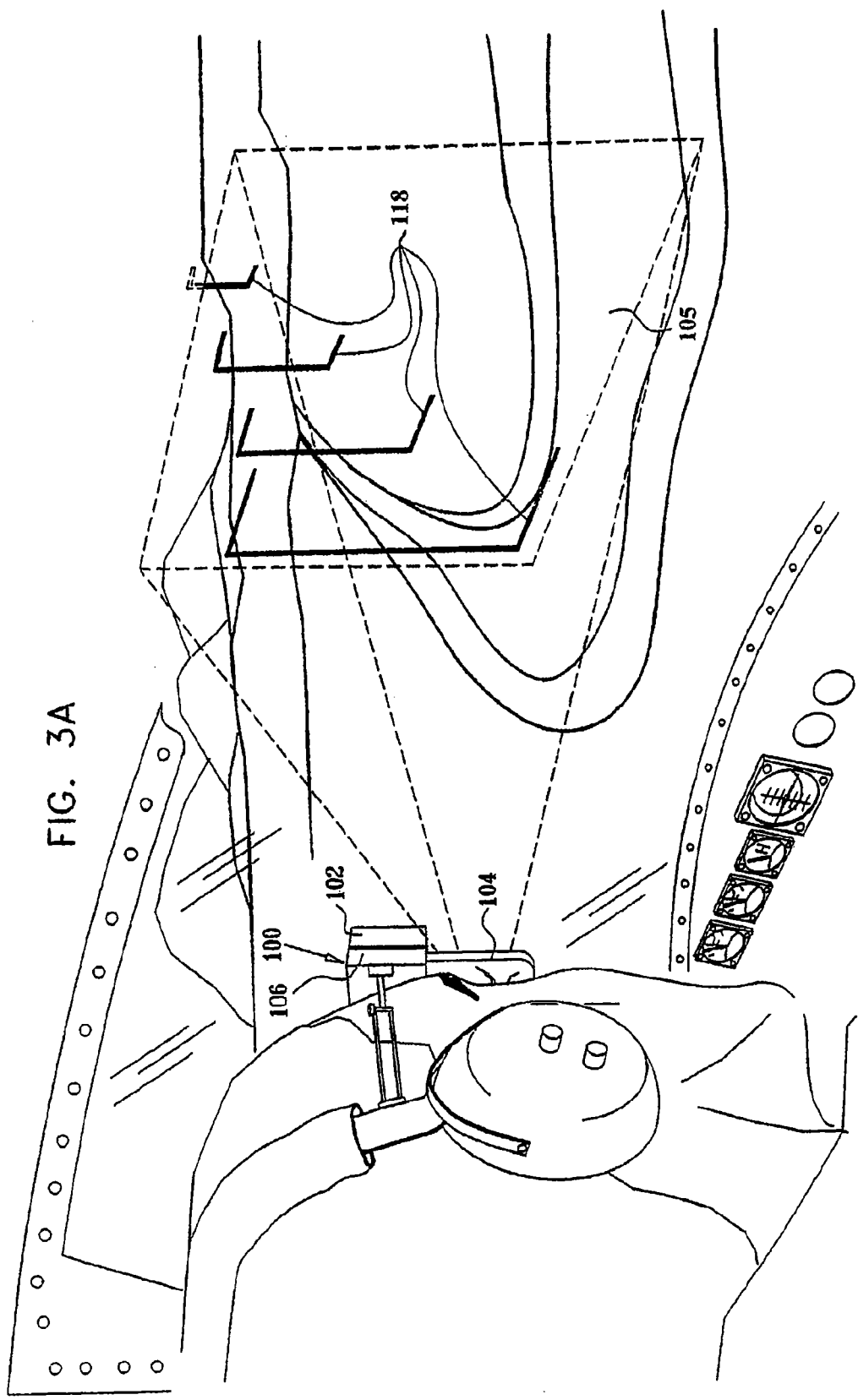

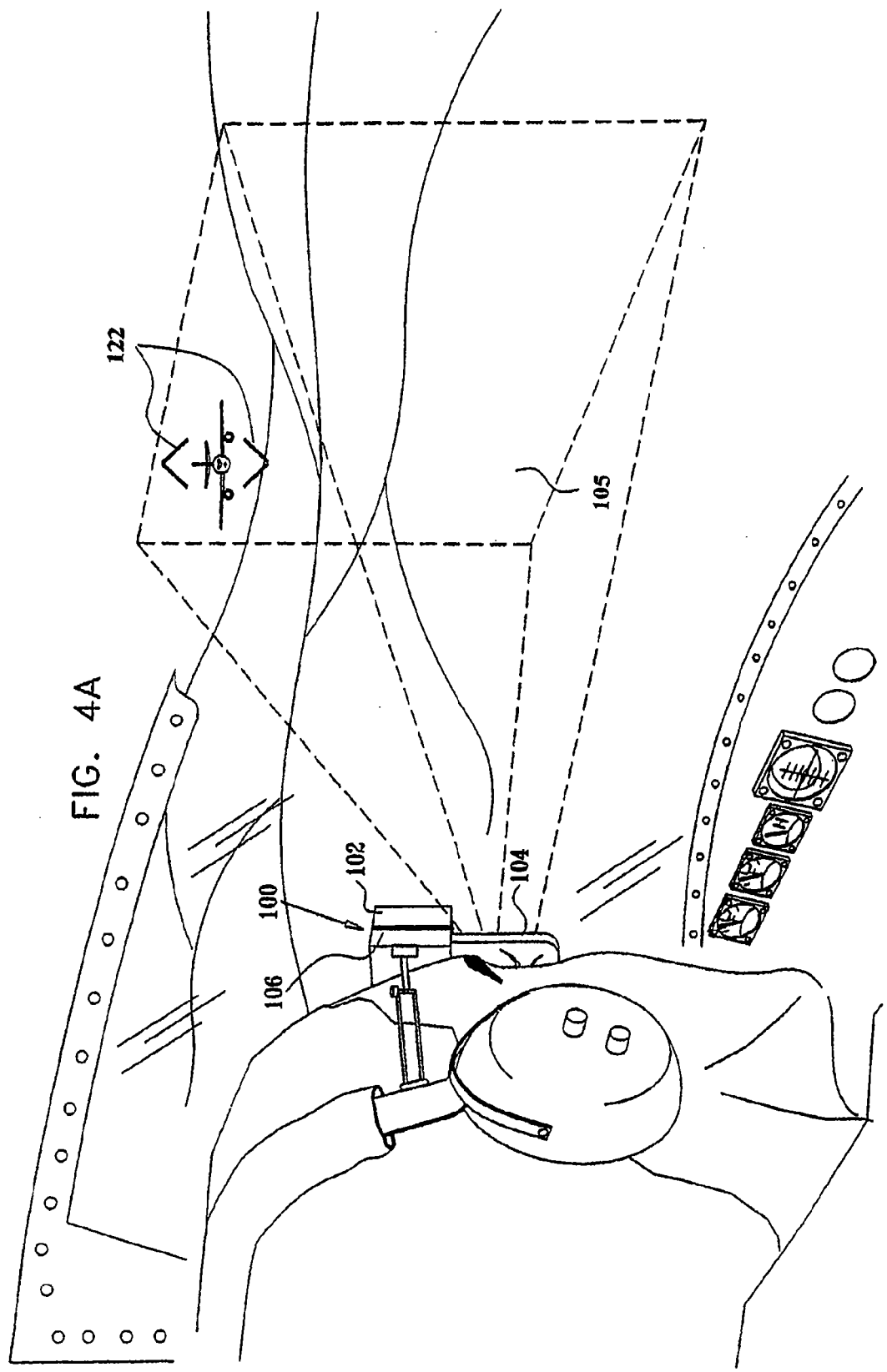

PERSONAL NAVIGATION SYSTEM

CROSS REFERENCE TO RELATED APPLICATIONS

This application is a continuation of application Ser. No. 11/816,520, filed Apr. 22, 2008 for Personal Navigation System. Application Ser. No. 11/816,520 is a US national phase of International application number PCT/IL2006/000195, filed Feb. 15, 2006, which claims priority to Israeli application number 166983, filed Feb. 17, 2005.

BACKGROUND OF THE INVENTION

1. Field of the Invention

The present invention relates to navigation systems generally and more particularly to visual navigational aids. Specifically, the present invention is concerned with personal aviation navigation systems.

2. Description of Related Art

The following U.S. patents are believed to represent the current state of the art: U.S. Pat. Nos. 6,809,724; 6,798,391; 6,771,423; 6,757,068; 6,747,611; 6,727,865; 6,681,629; 6,661,438; 6,608,884; 6,563,648; 6,559,872; 6,474,159; 6,408,257; 6,384,982; 6,380,923; 6,359,609; 6,356,392; 6,353,503; 6,304,303; 6,222,677; 6,204,974; 6,157,533; 6,140,981; 6,127,990; 6,108,197; 6,094,242; 6,057,966; 6,050,717; 5,886,822; 5,880,773; 5,844,656; 5,798,733; 5,764,280; 5,581,492 and 5,757,339.

The following patent publications are also believed to be of interest: Published PCT Applications: W004015369; W002086590; W00180736; W00156007; W00116929; W00109636; W00023815; W00010156; W09733270; W09725646; W09637798; W09636898; W09607947; W09605532; W09600406; W09521395; W09510106; W09510061; W09424658; W09414152; W09411855; W09407161 and W09301683.

Foreign Patent Publications: EP 1310859; EP 1280457; EP 1267197; EP 1248180; EP1223729; EP1220080; EP1185142; EP1176449; EP1135765; EP1042698; EP1022644; EP0935183; EP0904560; EP0902312; EP0889346; EP0825470; EP0802440; EP0775327; EP0772790; EP0771433; EP0724758; EP0721614; EP0716329; EP0694196; EP0670537; EP0672286; EP0627644; EP0592591 and EP0344881.

SUMMARY OF THE INVENTION

The present invention relates to a personal navigation system including a head-mounted orientation sensor, a coordinate position sensor, a head-mounted display and a processor receiving an input from the head-mounted orientation sensor and an input from the coordinate position sensor and providing a visually sensible output for displaying on the head-mounted display.

Preferably, the display is at least partially transparent. Additionally or alternatively, the coordinate position sensor is a portable coordinate position sensor. Additionally, the portable coordinate position sensor includes at least one of a user-worn sensor and a user carried sensor.

Preferably, the processor does not receive any inputs from navigational instrumentation of an aircraft. Alternatively, the processor receives input from a coordinate position sensor onboard a carrier vehicle such as an aircraft, in addition to the inputs from the coordinate position sensor.

Preferably, the processor is a portable processor. Additionally or alternatively, the portable processor includes at least one of a user-worn processor and a user-carried processor.

Preferably, the coordinate position sensor includes a GPS receiver. Additionally or alternatively, the personal aviation system is mounted onto a headset.

Preferably, the head-mounted orientation sensor includes an inertial sensor. Preferably, the processor and the display provide location indication functionality. Additionally, the location indication functionality includes landing strip designation functionality.

Alternatively or additionally, the processor and the display provide approaching aircraft warning and designation functionality. Additionally, the approaching aircraft warning and designation functionality includes an audio warning. Additionally, the approaching aircraft warning and designation functionality includes a visual warning. Additionally, the visual warning includes a flashing visual warning.

Preferably, the processor and the display provide airport approach path designation functionality. Additionally or alternatively, the processor and the display provide temporary flight restriction zone designation functionality. Additionally or alternatively, the processor and the display provide user head turning direction designation functionality.

Preferably, the head-mounted display is operative to display visually sensible navigation outputs overlaid on a view of a scene, which is seen through the head-mounted display. Additionally or alternatively, the head-mounted display is operative to display a visual symbol, which can be used to designate a location on the ground in the line-of-sight of a pilot, and thereby identify the designated location.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIGS. 1A and 1B are illustrations of a user-carried personal aviation navigation and orientation system, constructed and operative in accordance with a preferred embodiment of the present invention;

FIGS. 3A and 3B are illustrations of another application of the personal aviation navigation and orientation system of FIGS. 1A and 1B, constructed and operative in accordance with a preferred embodiment of the present invention, shown in two alternative operative orientations;

FIGS. 4A and 4B are illustrations of yet another application of the personal aviation navigation and orientation system of FIGS. 1A and 1B, constructed and operative in accordance with a preferred embodiment of the present invention, shown in two alternative operative orientations.

DETAILED DESCRIPTION OF THE PREFERRED EMBODIMENTS

Figure 1A:
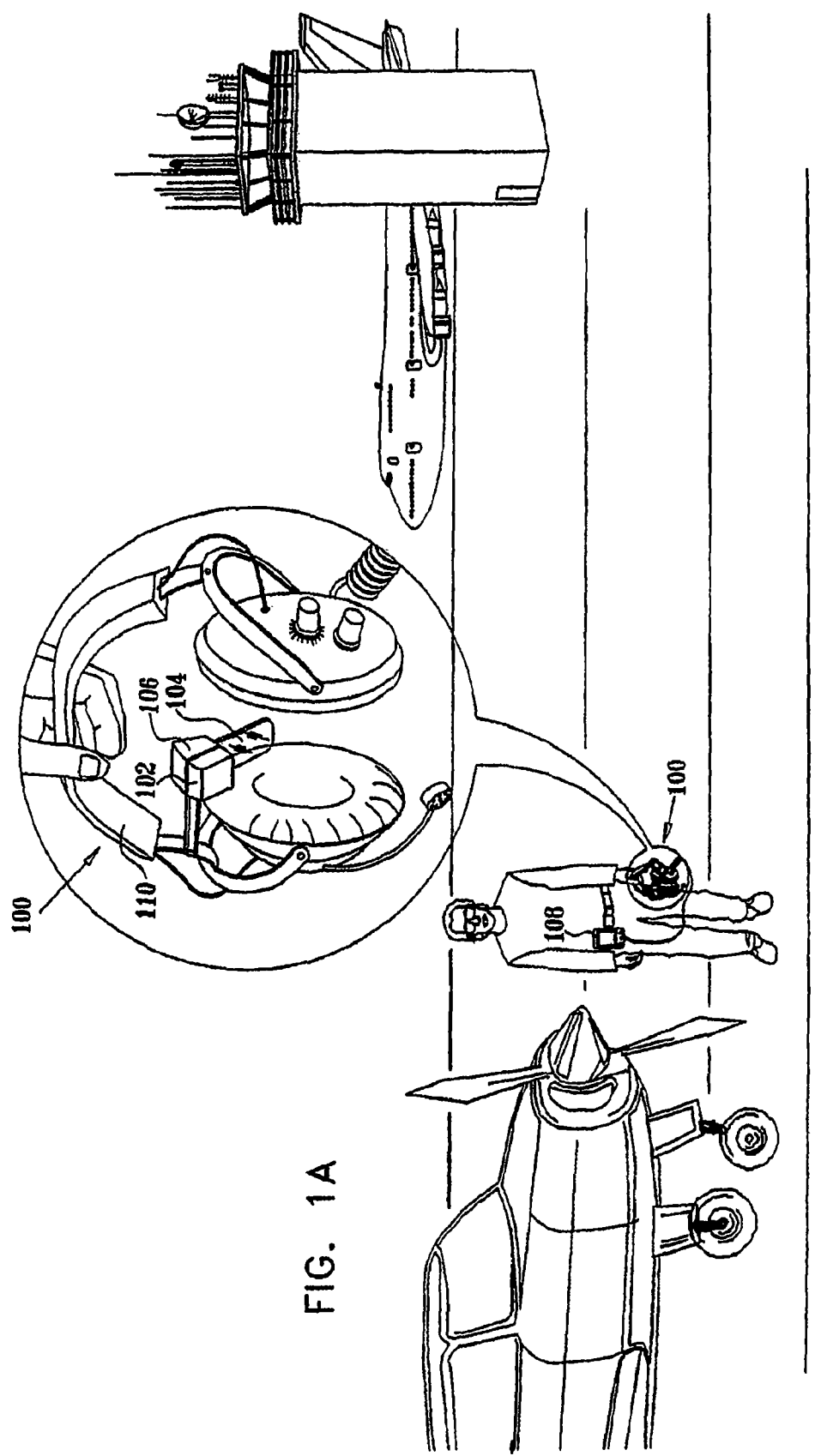

Reference is made to FIGS. 1A and 1B, which are pictorial illustrations of a preferred embodiment of a user carrying and using a personal navigation and orientation system 100, e.g., a personal aviation navigation and orientation system. For further understanding, the following description will specifically relate to aviation navigation, which merely constitutes a non-limiting example of the most common use of the subject navigational system, which is also utilizable on land and at sea. The personal aviation navigation and orientation system 100 is mountable on a user's head and preferably comprises a head position and orientation sensor 102 and a display 104, which displays visually sensible navigation outputs overlaid or superimposed on a view of a scene 105, seen through display 104. The orientation sensor 102 is firmly mounted onto the display 104, thereby allowing the user to readjust the personal aviation navigation and orientation system 100 on the head, while maintaining the accuracy of orientation sensor measurement of the line-of-sight through the display to the desired location.

The display 104 may additionally display flight information, such as a Primary Flight Display including artificial horizon, air speed and height, as well as secondary information including squawk frequency, airfield data and the like. Additionally, the personal aviation navigation and orientation system 100 may have access to database information, such as the locations of airstrips and landing procedures for each, as well as major landscape waypoints, such that identification information may be generated for display on display 104. Moreover, the system 100 is preferably connected to a collision avoidance system (not shown), such as a Traffic Collision Avoidance System (TCAS), for generating information relating to a possible collision situation. The system may further be connected to an active information system (not shown) capable of dynamically generating information concerning Temporary Flight Restriction (TFR) zones in close proximity to the aircraft.

The visually sensible navigation outputs displayed on display 104 are provided by a processor 106, preferably a portable processor, which is advantageously head mounted, but may alternatively be carried or worn by the user. The processor 106 receives a head orientation output from sensor 102 and also receives a user location input from a coordinate position sensor 108, such as a GPS receiver. Coordinate position sensor 108 is preferably a portable coordinate position sensor, such as a head-mounted, user-carried or worn, GPS receiver. Alternatively or additionally, personal aviation navigation and orientation system 100 may receive user location input from an onboard aircraft coordinate position sensor.

It is a particular feature of the present invention that the visually sensible navigation outputs displayed on display 104 do not require any interface with the navigation or other instrumentation of an aircraft, thus substantially simplifying the design of system 100, alleviating the need for installation expertise and certification, and thereby lowering its cost. It is appreciated, however, that where user location inputs from aircraft-installed instrumentation are available, this data can additionally or alternatively be obtained through an interface to the aircraft-installed instrumentation.

In accordance with a preferred embodiment of the present invention, the personal aviation navigation and orientation system 100 is mounted onto a conventional pilot's headset 110. The sensor 102 is preferably a commercially available inertial sensor, such as an InertiaCube, commercially available from Intersense Inc. of Bedford, Mass., U.S.A. The display 104 is preferably an at least partially transparent display, and the processor generated visually sensible navigation outputs are superimposed over an external view seen by the user. The display is preferably a display of the type described in any of the following published patent documents of the applicant/assignee, the disclosures of which are hereby incorporated by reference: U.S. Pat. No. 6,829,095, European Patent Numbers EP1485747AI and EP1295163A2 and Published PCT Application Numbers W00308132OA1 and WOO 195027.

Alternatively, display 104 may be opaque, and personal aviation navigation and orientation system 100 may be operative to generate a display of an external scene 105 that would be seen by the user with the visually sensible navigation outputs superimposed thereupon.

The processor 106 is preferably a commercially available microcontroller and is operative to combine the inputs of sensor 102 and of coordinate position sensor 108 and to provide visually sensible navigation indications, having the functionality described hereinbelow with reference to FIGS. 2A to 5B.

It is noted that although in the illustrated embodiment, the processor 106 is shown to communicate via a wired communication link with coordinate position sensor 108 communication between processor 106 and coordinate position sensor 108 may be via a wireless communication link. It is further noted that although in the illustrated embodiment processor 106 and coordinate position sensor 108 are shown as individual components, processor 106 and coordinate position sensor 108 may be incorporated into a single component which may be either head mounted or user carried or worn.

Figure 2A:
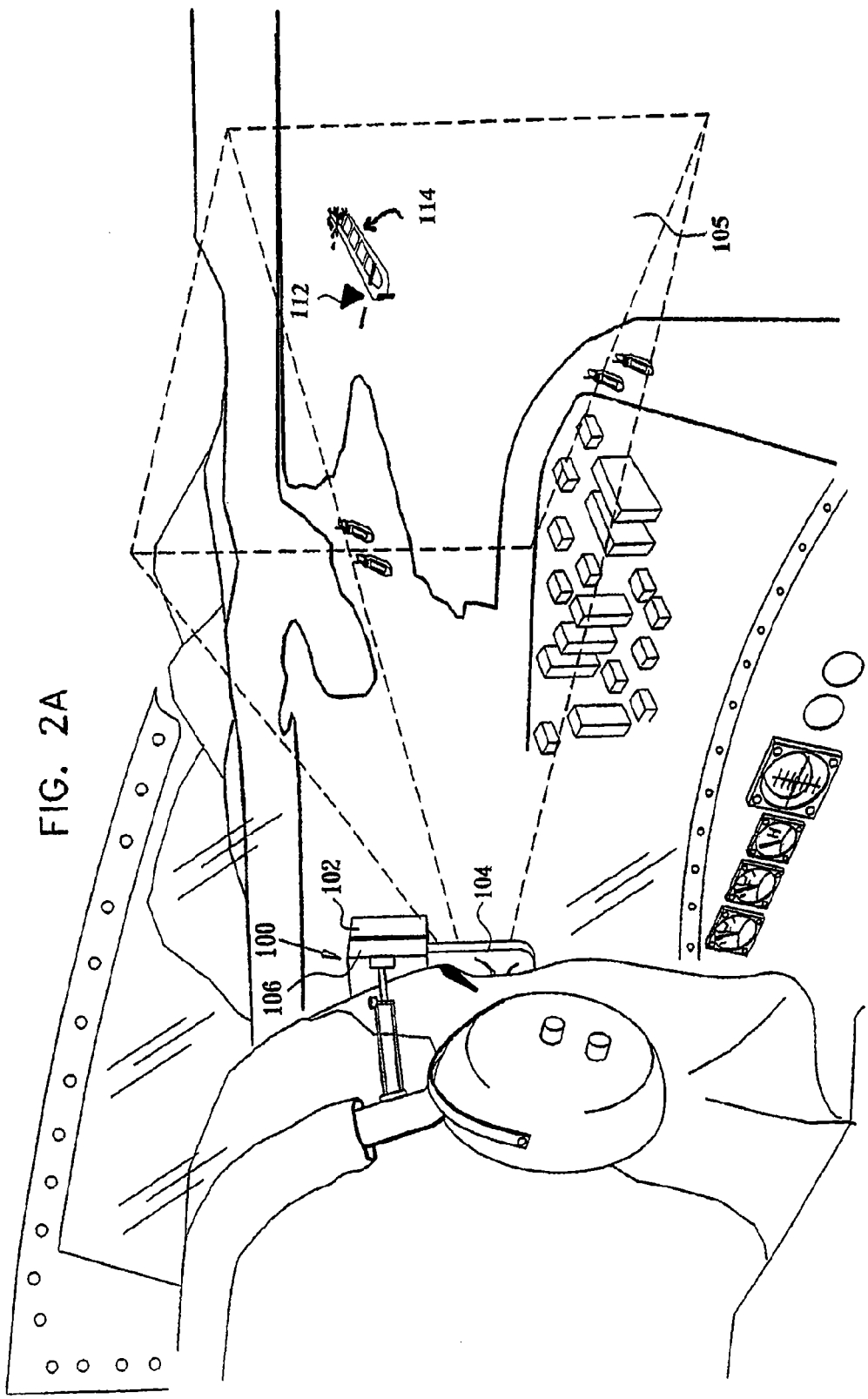
FIGS. 2A and 2B are illustrations of an application of the personal aviation navigation and orientation system of FIG. 1, constructed and operative in accordance with a preferred embodiment of the present invention, shown in two alternative operative orientations.
Figure 2B:
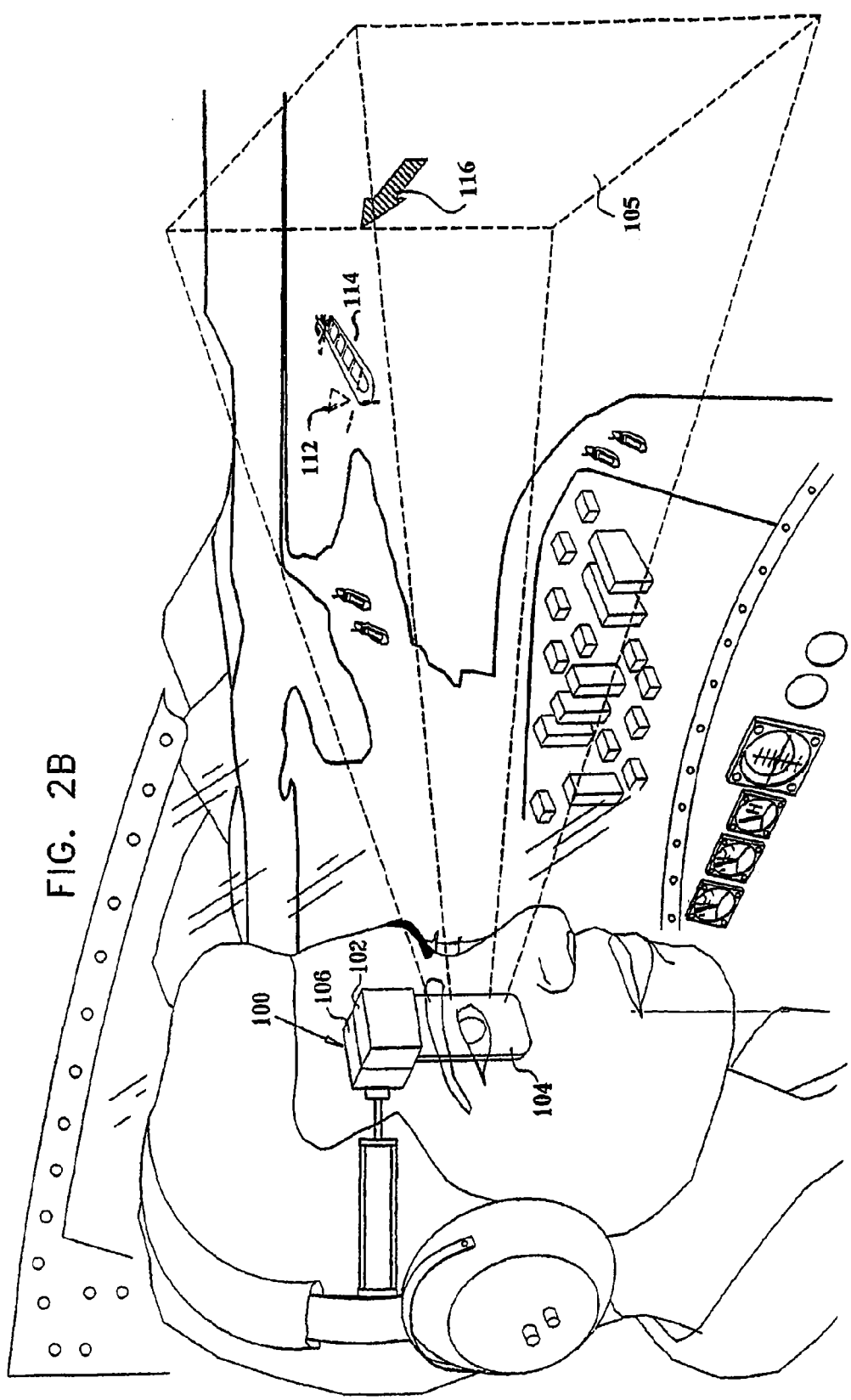

Referring to FIGS. 2A and 2B, in the illustrated embodiment, the processor 106 is operative to generate a location indicator symbol, such as crosshairs or frames, designated by reference numeral 112, to coincide with the line-of-sight of the user to a desired location and thereby indicate a desired location, such as a landing strip 114. FIG. 2A shows what the user sees when the desired location is positioned within the field-of-view of the display 104. When the desired location is outside the field-of-view of the display 104, as illustrated in FIG. 2B, suitable symbols or text, such as an arrow, designated by reference numeral 116, is generated on display 104 indicating the direction in which the user should turn his head in order to see the desired location, here indicated by crosshairs 112 in phantom lines. In addition to the symbolic indication of the location of the desired position, a suitable label such as the name and/or ground coordinates location of the position, may also be displayed on display 104.

In addition to the mode of operation described above, personal aviation navigation and orientation system 100 of FIG. 1 may also be operative in a locate mode. In this mode, the system is operative to provide information concerning a user-designated location. In this mode of operation, processor 106 is operative to generate a location indicator symbol, such as crosshairs 112, at the center of display 104. The user then moves his head to overlay the line-of-sight of the location indicator symbol over a desired location on the ground, and activates processor 106 to identify this location. Processor 106 uses the coordinates of the coordinate position sensor 108 and the orientation sensor 102 to calculate the location to which the user is pointing and provides to the user the information on the location to which he has pointed to.

It is noted that system 100 is preferably calibrated automatically by correlating the time-evolved measurements of the coordinate position sensor 108 and the measurements obtained by the head-mounted orientation sensor 102. Alternatively, the system 100 may be calibrated manually by entering a calibration mode upon startup. In the calibration mode, similar to the locate mode described above, a location indicator symbol is positioned at the center of display 104. The user then positions the location indicator symbol, preferably by turning his head, at least one, and preferably three or more, distant, preprogrammed locations spread over a wide azimuthal range, approving each location as it is acquired by processor 106. The system processor 106 can then analyze the data to average out measurement errors and provide a baseline orientation for orientation sensor 102. Performing such a calibration within the cockpit of the plane can serve to alleviate any potential interference in the measurement of orientation sensor 102 as a result of magnetic effects due to the plane's structural metal components.

Figure 3B:
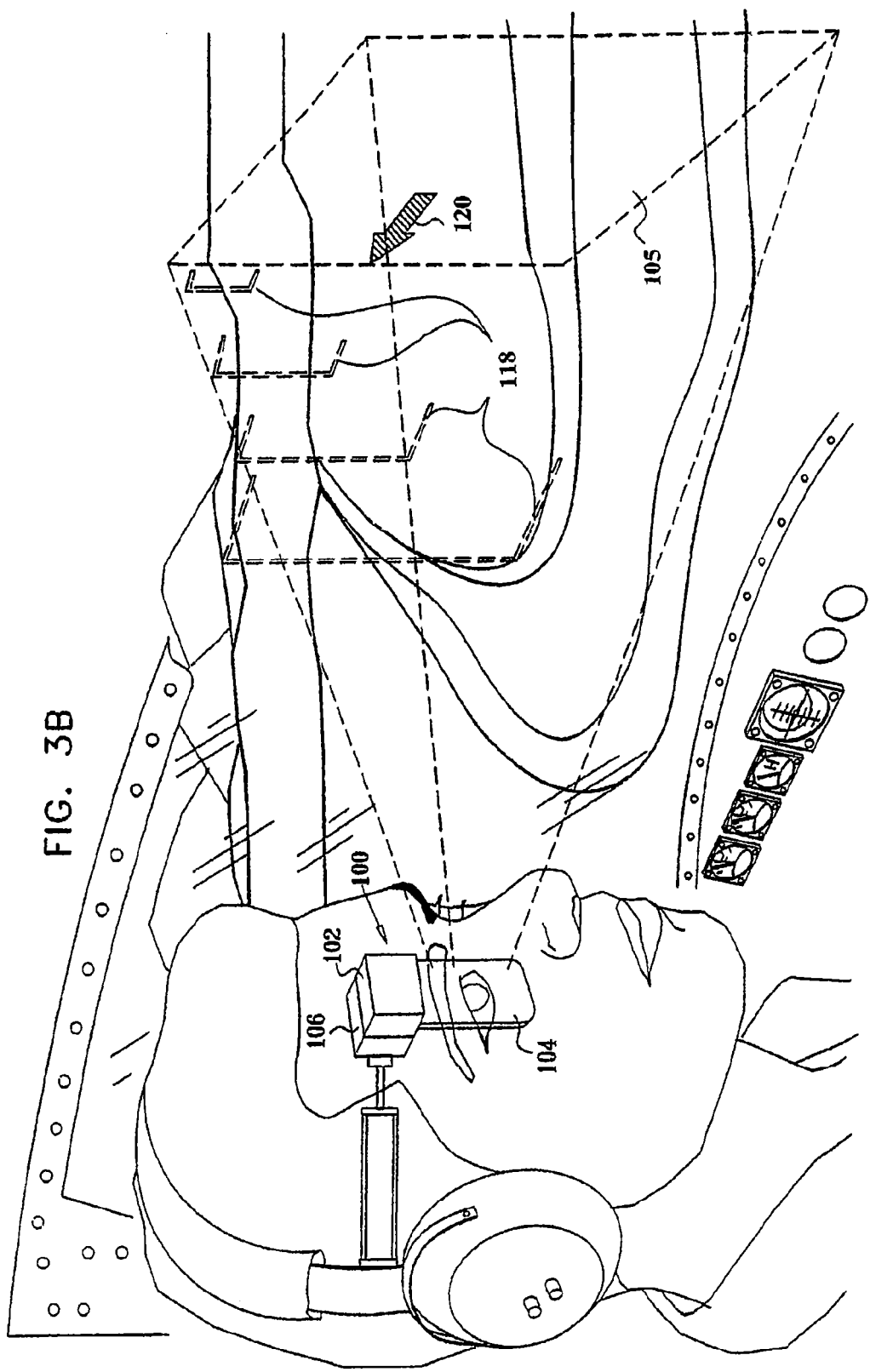

Reference is now made to FIGS. 3A and 3B, which are simplified pictorial illustrations of another application of the personal aviation navigation and orientation system 100 of FIG. 1, constructed and operative in accordance with a preferred embodiment of the present invention, shown in two alternative operative orientations. In the illustrated embodiment, the processor 106 is operative to generate a location indicator, such as a series of symbols, designated by reference numeral 118, to indicate a Temporary Flight Restriction (TFR) zone boundary. FIG. 3A shows what the user sees on display 104 when the TFR zone boundary is positioned within the field-of-view of the display 104. When the desired TFR zone boundary is outside the field-of-view of the display 104, as illustrated in FIG. 3B, suitable symbols or text, such as an arrow, designated by reference numeral 120, is generated on display 104 indicating to the direction in which the user should turn his head in order to see the boundary of the TFR zone, here indicated by a series of symbols 118 shown in phantom. In addition to the symbolic indication of the TFR zone, a suitable label such as the name and/or ground the name and or coordinate location of the TFR zone and other information, such as its validity times, may also be displayed on display 104.

Figure 4B:
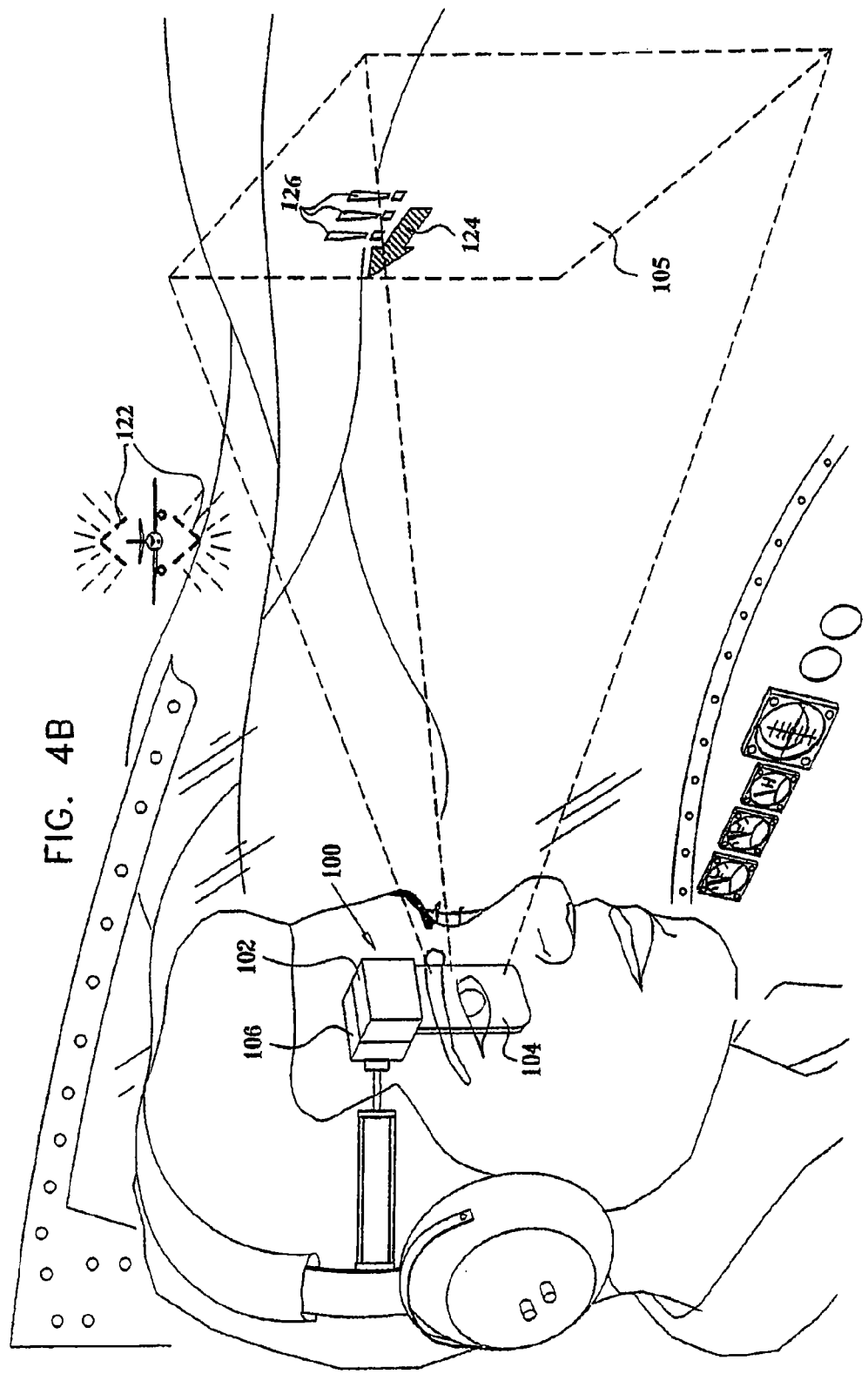

Reference is now made to FIGS. 4A and 4B, which are simplified pictorial illustrations of yet another application of the personal aviation navigation and orientation system 100 of FIG. 1, constructed and operative in accordance with yet another preferred embodiment of the present invention, shown in two alternative operative orientations. In the illustrated embodiment, the processor 106 is operative to generate a location indicator symbol, such as a pair of chevrons, designated by reference numeral 122, to indicate an approaching aircraft on display 104 and a potentially dangerous collision situation. FIG. 4A shows what the user sees on display 104 when the approaching aircraft is positioned within the field-of-view of the display 104. When the approaching aircraft is outside the field-of view of the display 104, as illustrated in FIG. 4B, suitable symbols or text, such as an arrow, designated by reference numeral 124, is generated on display 104 indicating the direction in which the user should turn his head in order to see the approaching aircraft, here indicated by chevrons 122 shown in phantom. Typically, audio and other visual warnings, such as flashing symbols 126 may also be provided to alert the user to the potential danger of an approaching aircraft. In addition to the symbolic indication of the approaching aircraft, a suitable label, such as the name and or communication channels relevant to the approaching aircraft can also be displayed on display 104.

Figure 5A:
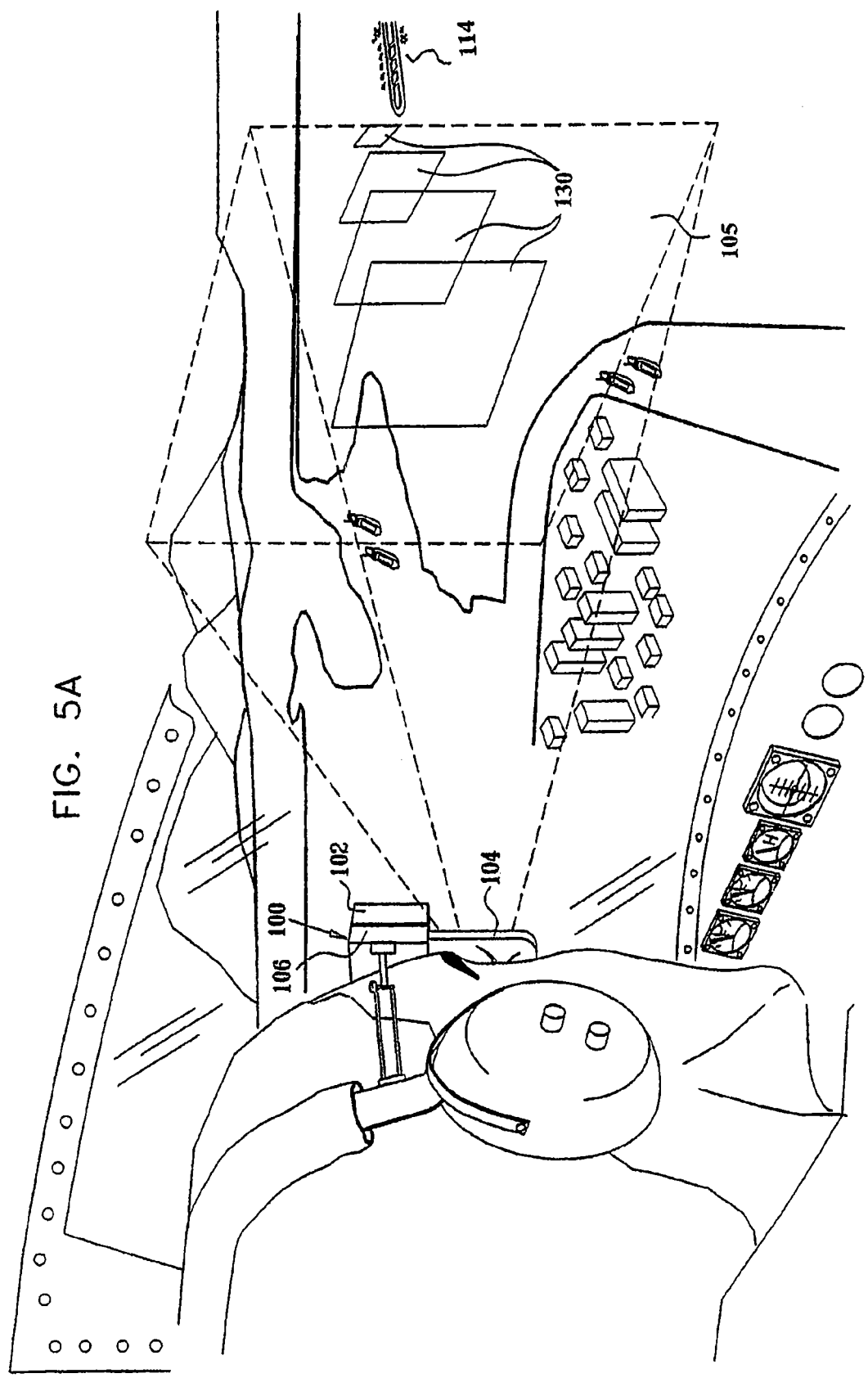
FIGS. 5A and 5B pictorial illustrations of yet another application of the personal aviation navigation and orientation system of FIGS. 1A and 1B, constructed and operative in accordance with a preferred embodiment of the present invention, shown in two alternative operative orientations.
Figure 5B:
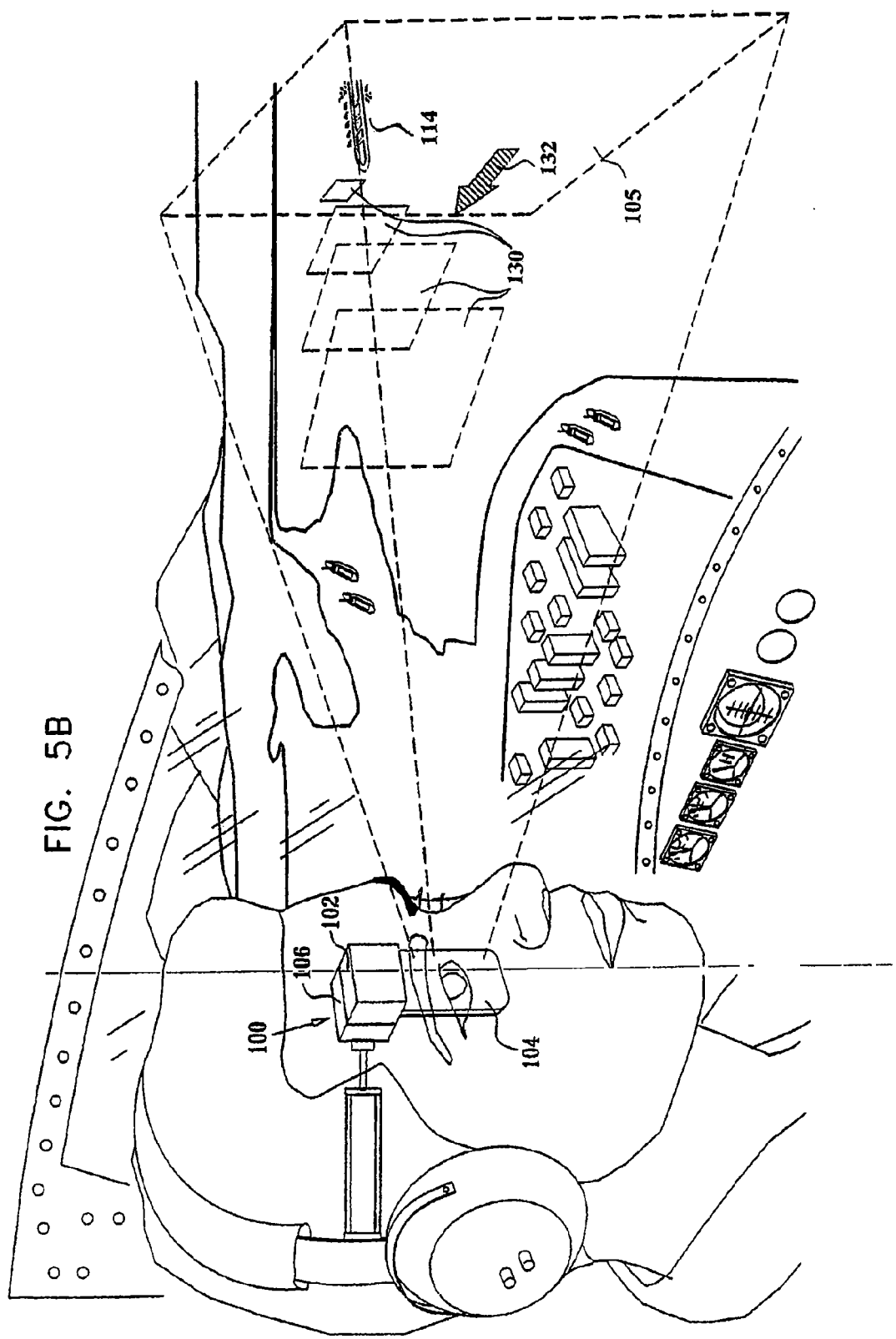

Reference is now made to FIGS. 5A and 5B, which are simplified pictorial illustrations of still another application of the personal aviation navigation and orientation system 100 of FIG. 1, constructed and operative in accordance with a preferred embodiment of the present invention, shown in two alternative operative orientations. In the illustrated embodiment, the processor 106 is operative to generate a location indicator symbol, such as a series of converging rectangular frames, designated by reference numeral 130, to indicate a landing approach path to an airport. FIG. 5A shows what the user sees on display 104 when the direction of the approach path is positioned within the field-of-view of the display 104. When the direction of the approach path is outside the field-of-view of the display 104, as illustrated in FIG. 5B, suitable symbols or text, such as an arrow, designated by reference numeral 132, is generated on display 104 indicating the direction in which the user should turn his head in order to see the approach path, here indicated by frames 130 shown in phantom. In addition to the symbolic indication of the approach, the name, calling frequencies and other relevant information may also be displayed on display 104.

It is noted that although the examples brought hereinabove are oriented towards pilots, the present invention could be equally useful for other functional operators in airborne applications, such as equipment operators, gunners and the like, as well as users of other navigational applications such as found in sailing, coordinated operations in safety and military applications, and audio-visual personal guides.

It is also noted that in the system of the present invention the position of the aircraft is received from coordinate position sensor measurements, while the orientation of the user's line-of-sight is measured at the user's head. Alternatively, the coordinate position measurements may be combined with an input from Wide Area Augmentation System (WAAS) to provide for unproved height measurement accuracy compared to standard GPS measurements. Alternatively or additionally, the coordinate position sensor measurements may be combined with data from a Pitot tube of the aircraft for improved height data, or coordinate position measurements may be received from instruments within the aircraft. Additionally, as a consequence of the large distance to the points of interest, the effect of possible separation between the location of the coordinate position sensor 108 and the orientation sensor 102 is negligible. In other cases, where the separation of the orientation sensor 102 and the coordinate positioning sensor 108 is significant, it can be accounted for or measured by introducing additional sensors.

It is further noted that the system of the present invention a user may enter a series of waypoints to assist in navigation along a planned route. The waypoints can be given names and can be called up in sequence onto display 104 to assist navigation. Navigation may also be assisted by use of database information, such as displaying the location of the nearest possible landing strip in a case of emergency landing.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to a person of ordinary skill in the art upon reading the foregoing description, and which are not in the prior art.

What is claimed is:

1. A personal navigation system comprising:
   a) a unit directly detachable to a navigator's head, the unit including:
      (i) a head orientation sensor, and
      (ii) a display having a light-transmitting substrate, optical means for coupling light into the substrate by total internal reflection, and at least one partially reflecting surface located in the substrate;
         said display firmly connected with the sensor so as to be oriented in front of at least one eye of the navigator when wearing the unit,
   b) a coordinate position sensor, and c) a processor receiving input from the head orientation sensor and the coordinate position sensor, and providing a visually sensible output for displaying on the display, wherein the display is a see-through combiner and wherein the navigator can see the external scene through the display.

2. The personal navigation system according to claim 1, wherein the display is an at least partially transparent display.

3. The personal navigation system according to claim 1, wherein the coordinate position sensor is a portable coordinate position sensor.

4. The personal navigation system according to claim 3, wherein the portable coordinate position sensor includes at least one of a user-worn sensor and a user-carried sensor.

5. The personal navigation system according to claim 1, wherein the processor operates autonomously from any inputs from navigational instrumentation of a carrier vehicle.

6. The personal navigation system according to claim 1, wherein the coordinate position sensor is an onboard carrier vehicle coordinate position sensor.

7. The personal navigation system according to claim 6, wherein the carrier vehicle is an aircraft and the system is an aviation navigation system.

8. The personal navigation system according to claim 1, wherein the processor comprises a portable processor.

9. The personal navigation system according to claim 8, wherein the portable processor comprises at least one of a user-worn processor and a user carried processor.

10. The personal navigation system according to claim 1, wherein the coordinate position sensor comprises a GPS receiver.

11. The personal navigation system according to claim 1, wherein the personal navigation system is coupled with a headset.

12. The personal navigation system according to claim 1, wherein the head orientation sensor comprises an inertial sensor.

13. The personal navigation system according to claim 1, wherein the processor and the display provide location indication functionality.

14. The personal navigation system according to claim 13, wherein the location indication functionality comprises landing strip designation functionality.

15. The personal navigation system according to claim 1, wherein the processor and the display provide approaching vehicle warning and designation functionality.

16. The personal navigation system according to claim 15, wherein the approaching vehicle warning and designation functionality comprises an audio warning.

17. The personal navigation system according to claim 15, wherein the approaching vehicle warning and designation functionality comprises a visual warning.

18. The personal navigation system according to claim 17, wherein the visual warning comprises a flashing visual warning.

19. The personal navigation system according to claim 1, wherein the processor and the display provide airport approach path designation functionality.

20. The personal navigation system according to claim 1, wherein the processor and the display provide temporary flight restriction zone designation functionality.

21. The personal navigation system according to claim 1, wherein the processor and the display provide user head-turning direction designation functionality.

22. The personal navigation system according to claim 1, wherein the head-mounted display is operative to display a visual symbol utilizable to designate a location on the ground in the line-of-sight of a pilot, for identifying a designated location.

23. The personal navigation system according to claim 1, wherein the processor is mounted on the display.

* * * * *